(12) United States Patent
Ramsey, Jr. et al.

(10) Patent No.: US 7,646,473 B1
(45) Date of Patent: Jan. 12, 2010

(54) DETERMINING POSITION INSIDE BUILDING VIA LASER RANGEFINDER AND HANDHELD COMPUTER

(75) Inventors: James L. Ramsey, Jr., Albuquerque, NM (US); Patrick Finley, Albuquerque, NM (US); Brad Melton, Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 16 days.

(21) Appl. No.: 11/509,161

(22) Filed: Aug. 24, 2006

Related U.S. Application Data

(60) Provisional application No. 60/711,364, filed on Aug. 25, 2005.

(51) Int. Cl.
*G01C 3/08* (2006.01)
(52) U.S. Cl. ..................................... 356/4.01
(58) Field of Classification Search ......... 356/4.01–4.1, 356/3.01–3.15, 5.01–5.15, 6–22
See application file for complete search history.

(56) References Cited

U.S. PATENT DOCUMENTS

| 5,337,149 | A | * | 8/1994 | Kozah et al. | ................. | 356/601 |
| 5,416,321 | A | * | 5/1995 | Sebastian et al. | ............ | 250/288 |
| 2005/0099637 | A1 | * | 5/2005 | Kacyra et al. | ............... | 356/601 |
| 2006/0061752 | A1 | * | 3/2006 | Solomon et al. | ........... | 356/4.03 |

* cited by examiner

*Primary Examiner*—Thomas H Tarcza
*Assistant Examiner*—Luke D Ratcliffe
(74) *Attorney, Agent, or Firm*—Madelynne J. Farber

(57) ABSTRACT

An apparatus, computer software, and a method of determining position inside a building comprising selecting on a PDA at least two walls of a room in a digitized map of a building or a portion of a building, pointing and firing a laser rangefinder at corresponding physical walls, transmitting collected range information to the PDA, and computing on the PDA a position of the laser rangefinder within the room.

20 Claims, 1 Drawing Sheet

DETERMINING POSITION INSIDE BUILDING VIA LASER RANGEFINDER AND HANDHELD COMPUTER

CROSS-REFERENCE TO RELATED APPLICATIONS

This application claims priority to and the benefit of the filing of U.S. Provisional Patent Application Ser. No. 60/711,364, entitled "Determining Position Inside Building Via Laser Rangefinder and Handheld Computer", filed on Aug. 25, 2005, and the specification and claims thereof are incorporated herein by reference.

STATEMENT REGARDING FEDERALLY SPONSORED RESEARCH OR DEVELOPMENT

The Government has rights to this invention pursuant to Contract No. DE-AC04-94AL85000 awarded by the U.S. Department of Energy.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to determining one's location within a building, particularly one's location within a user-occupied room of a building.

2. Description of Related Art

Certain projects require that one accurately locate oneself within a building, such as when taking an environmental sample within a building. Global Positioning Systems (GPS) and Radio Frequency (RF) triangulation methods do not work well within many buildings of interest. The present invention employs a digital map of a building's interior on a handheld computer/personal data assistant (PDA). To provide positional information when RF triangulation methods fail, the present invention provides an innovative method of, software for, and apparatus for positioning using a laser rangefinder and a PDA.

Current laser rangefinders simply report the distance from the laser instrument to an object the laser is pointed at. There is no provision for translating these distance measurements to local x,y positions and then to global x,y positions as is done in the present invention.

Currently available positioning systems rely on triangulation. Systems include fixed ultrasonic transducers and systems with fixed RF receivers. These systems suffer from a need for a calibrated, fixed sensor infrastructure and uniform penetration of the locator signals. The present invention is ad-hoc in that the transmitter, receiver and processor are mobile, and the invention is not affected by RF opacity.

BRIEF SUMMARY OF THE INVENTION

The present invention is of an apparatus, computer software, and a method of determining position inside a building, comprising: selecting on a PDA at least two walls of a room in a digitized map of a building or a portion of a building; pointing and firing a laser rangefinder at corresponding physical walls; transmitting collected range information to the PDA; and computing on the PDA a position of the laser rangefinder within the room. In the preferred embodiment, at least two of the at least two walls are orthogonal. Points on the walls may be selected, with pointing and firing of the laser rangefinder at corresponding points on the corresponding physical walls. The PDA displays the computed position, preferably with distances from the computed position to the at least two walls, and most preferably also with distances from the computed position to other walls. Directional information may also be transmitted to the PDA. A floor or ceiling of the room may be selected in the digitized map, together with pointing and firing a laser rangefinder at a corresponding physical floor or ceiling, with the computing step computing a three-dimensional position.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is of a method, software, and apparatus for accurately determining the position of a person within a building. The method involves: (1) pointing and firing a laser rangefinder at a wall within a room; (2) pointing and firing the laser rangefinder at a second wall within the room; (3) transferring the results of the two measurements to a PDA; and (4) calculating on the PDA a position in the room based upon the two measurements and a digitized floor plan of the building containing the room.

In a rectangular room, a location within the room can be determined by two measurements: (1) Distance from a first wall gives the Y coordinate of the position; and (2) Distance from a second wall orthogonal to the first wall gives the X coordinate of the position. For non-rectangular rooms, the position can be determined in the same fashion if points on two walls are selected.

Figure 3:
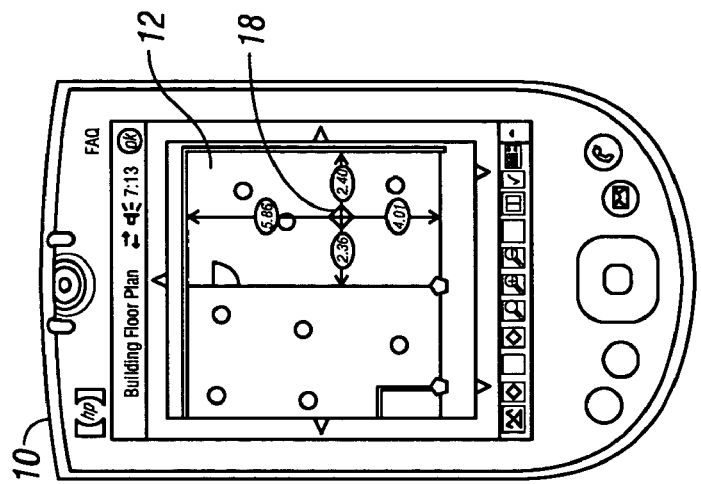
FIG. 3 shows the PDA displaying the calculated position of the user after executing the process of FIG. 2.
Figure 2:
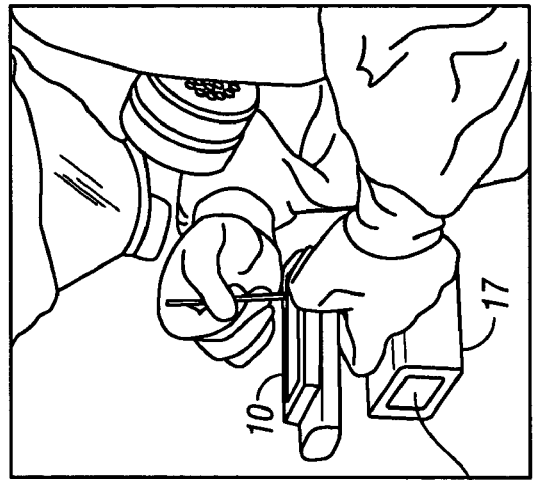
FIG. 2 shows a user in the process of selecting a first wall on the PDA display, firing the laser rangefinder, selecting a second wall, and again firing the laser rangefinder.
Figure 1:
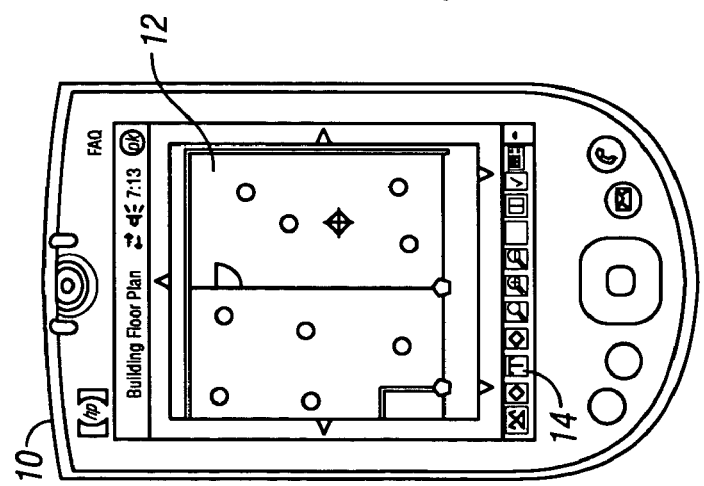
FIG. 1 shows a PDA employing software of the invention prior to use choice of walls and firing of the laser rangefinder.

As shown in FIGS. 1-3, the preferred apparatus 20 of the invention comprises a laser rangefinder 16 (such as a Leica Disto Plus™ Laser Rangefinder), a PDA 10 (such as a Hewlett-Packard IPAQ™), software implementing the invention, and a digitized floor plan of a target building interpretable by the software that is preferably displayed 12 by the software on the PDA's display. Software according to the invention can be written in any supported programming language, but presently C# is preferred. Both bitmap and vector formats are preferably supported. Bitmaps can be stored on the PDA as .gif and/or .jpg compressed image files. The preferred development environment, Microsoft .NET™, abstracts bitmap images such that any file format supported by the development environment is by default supported by the subject invention implementation. Bitmap file formats currently supported by Microsoft .NET include: .jpg, .gif, .bmp, .tif, .png, .emf, .wmf, .exi and .ico. Vector formats are likewise preferably abstracted by the time the laser distance measurements are compared. Preferably floor plans are read in as AutoCAD® .dwg and .dxf files and as Microstation™ .dgn files. In addition to the CAD files, building layouts can be read from simple vectors representing room, floor and zone polygons, stored in ESRI shape files and custom vector formats.

The method of the invention preferably proceeds as follows: (1) The user switches on laser positioning mode from the PDA screen. (2) The user points the laser rangefinder at a selected wall and picks the corresponding wall on the PDA display 12 such as via tapping with the PDA's stylus. (3) The PDA issues a command to laser rangefinder to take a distance measurement; (4) The laser rangefinder sends the result back to the PDA. (5) The PDA locates the appropriate wall in its digital map and then measures back the distance returned by the laser rangefinder to obtain a coordinate (X or Y) for the location. (6) Steps 2 through 5 are repeated for a second wall in the room, preferably orthogonal to the first. (7) The current position icon on the PDA map is updated to reflect the actual position of the device relative to the walls in the room. Distances to walls in various directions from the current position can also be displayed if desired. Also, the user can indicate a "Height" shot on the PDA and then point the laser to the floor and obtain a Z coordinate for a three-dimensional (3D) location.

Initial tests of an apparatus according to the invention resulted in a mean positional error of 0.57 m over ranges of up to 45 m. Subsequent tests have improved the performance of the invention to a mean positional error of approximately 0.1 m or better.

Addition of an optional electronic compass 17, such as the Revolution™ GS from True North Technologies, enables the system to operate with less user input. Rather than having to tell the system which walls the laser is pointing at, the bearing of the electronic compass defines a search vector which the system uses to find the wall that the laser intercepted.

In the present specification and claims, a "PDA" is defined as any computer apparatus with a display screen conventionally known as a hand-held computer, palm-top computer, personal data assistant, or personal digital assistant, as well as portable devices using goggles-mounted image projection. This includes devices employing the Palm® operating system, the Windows® Mobile operating system, and like operating systems, and includes such devices in combination with cellular telephones or other devices. The display screen may be touch-sensitive, or the apparatus may provide other means of interacting with the display screen, such as a keyboard, mouse, or eye-movement sensor.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of determining position inside a building, the method comprising:
   a user selecting on a PDA at least two walls of a room in a predetermined digitized map of a building or a portion of a building;
   a user pointing and firing a single laser rangefinder at each of the corresponding physical walls;
   transmitting collected range information to the PDA;
   computing on the PDA a position of the laser rangefinder within the room, and
   wherein the computing step does not employ input from a video camera.

2. The method of claim 1 wherein selecting comprises selecting points on the at least two walls and pointing and firing comprises a user pointing and firing the laser rangefinder at each of corresponding points on the corresponding physical walls.

3. The method of claim 1 wherein selecting comprises selecting at least two orthogonal walls.

4. The method of claim 1 additionally comprising displaying on the PDA the computed position.

5. The method of claim 4 additionally comprising displaying on the PDA distances from the computed position to the at least two walls.

6. The method of claim 5 additionally comprising displaying on the PDA distances from the computed position to other walls.

7. The method of claim 1 additionally comprising transmitting directional information to the PDA.

8. The method of claim 1 additionally comprising selecting on the PDA a floor of the room in the digitized map and pointing and firing a laser rangefinder at a corresponding physical floor, and wherein computing on a PDA comprises computing a three-dimensional position.

9. Computer software for determining position inside a building, said software comprising machine-readable code embodied on a computer-readable medium and comprising:
   code for allowing a user to select on a PDA at least two walls of a room in a predetermined digitized map of a building or a portion of a building;
   code for receiving collected range information transmitted from a single laser rangefinder pointed by a user and fired by a user at each of corresponding physical walls; and
   code for computing on the PDA a position of the laser rangefinder within the room; and
   wherein said code for computing does not employ input from a video camera.

10. The software of claim 9 wherein the selecting code comprises code for allowing a user to select points on the at least two walls and the receiving code comprises code for receiving range information transmitted from the laser rangefinder pointed and fired by the user at each of the corresponding points on the corresponding physical walls.

11. The software of claim 9 wherein the selecting code requires that at least two of the at least two walls are orthogonal.

12. The software of claim 9 additionally comprising code for displaying on the PDA the computed position.

13. The software of claim 12 additionally comprising code for displaying on the PDA distances from the computed position to the at least two walls.

14. The software of claim 13 additionally comprising code for displaying on the PDA distances from the computed position to other walls.

15. The software of claim 9 additionally comprising code for receiving directional information transmitted to the PDA.

16. The software of claim 9 additionally comprising code for selecting on the PDA a floor of the room in the digitized map and code for receiving range information transmitted from the laser rangefinder pointed and fired at a corresponding physical floor, and wherein the computing code computes a three-dimensional position.

17. An apparatus for determining position inside a building, said apparatus comprising:
- a PDA permitting user selection of at least two walls of a room in a predetermined digitized map of a building or a portion of a building;
- a single laser rangefinder pointable and fireable by a user at each of corresponding physical walls;
- a conduit permitting said laser rangefinder to send collected range information to the PDA; and
- a computer on the PDA to compute a position of the laser rangefinder within the room from said collected range information; and
- wherein said computer does not employ input from a video camera.

18. The apparatus of claim 17 wherein said PDA displays the computed position to the user.

19. The apparatus of claim 17 additionally comprising a direction determining device and a conduit permitting said device to send collected directional information to the PDA.

20. The apparatus of claim 17 wherein said PDA additionally permits user selection of a floor of the room in the digitized map, wherein said laser rangefinder is pointable and fireable at a corresponding physical floor, and wherein said computer computes a three-dimensional position.

* * * * *